United States Patent
Huang

(10) Patent No.: US 9,684,402 B2
(45) Date of Patent: Jun. 20, 2017

(54) TOUCH DISPLAY PANEL AND TOUCH DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventor: Zhongshou Huang, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

(*) Notice: Subject to any disclaimer, the term of this patent is extended or adjusted under 35 U.S.C. 154(b) by 0 days.

(21) Appl. No.: 14/422,174

(22) PCT Filed: Jan. 22, 2014

(86) PCT No.: PCT/CN2014/071114
§ 371 (c)(1),
(2) Date: Aug. 18, 2015

(87) PCT Pub. No.: WO2014/114233
PCT Pub. Date: Jul. 31, 2014

(65) Prior Publication Data
US 2016/0011705 A1   Jan. 14, 2016

(30) Foreign Application Priority Data
Jan. 25, 2013  (CN) .......................... 2013 1 0030355

(51) Int. Cl.
*G06F 3/041*     (2006.01)
*G06F 3/044*     (2006.01)
(Continued)

(52) U.S. Cl.
CPC ........ *G06F 3/0412* (2013.01); *G02F 1/13338* (2013.01); *G02F 1/13394* (2013.01); *G06F 3/044* (2013.01)

(58) Field of Classification Search
CPC ....... G02F 2001/136222; G02F 1/1368; G02F 1/13338; G02F 1/133514; G02F 1/1362;
(Continued)

(56) References Cited

U.S. PATENT DOCUMENTS 9,348,475 B2 * 5/2016 Hotelling .......... G02F 1/134363
2006/0152500 A1 * 7/2006 Weng ...................... G06F 3/045
345/173

(Continued)

FOREIGN PATENT DOCUMENTS

CN  101303465 A  11/2008
CN  101377596 A  3/2009
(Continued)

OTHER PUBLICATIONS

International Search Report for PCT Application No. PCT/CN2014/071114, mailed Apr. 23, 2014, 8 pages total.

*Primary Examiner* — Sanjiv D Patel
(74) *Attorney, Agent, or Firm* — Anova Law Group, PLLC

(57) ABSTRACT

Provided are a touch display panel and a touch display device. The touch display panel comprises a TFT array substrate (200) and a color film substrate (100) arranged opposite to each other. The TFT array substrate (200) comprises: a plurality of touch drive wires (TD), a plurality of touch sensing wires (TS), and a plurality of touch TFTs (220), one of the source (2053) and the drain (2054) of the touch TFTs (220) is electrically connected to the touch drive wires (TD), and the other one of the source (2053) and the drain (2054) of the touch TFTs (220) is electrically connected to the touch sensing wires (TS). The color film
(Continued)

substrate (100) comprises: a plurality of conductive pillars (110) facing the TFT array substrate (200), and the conductive pillars (110) are arranged corresponding to the touch TFTs (220) to control the channel current of the touch TFTs (220). TFT arrays in the provided touch display panel and touch display device are compatible with the existing pixel array structure and technology, without adding additional process steps, and the realization of the touch function and the realization of the display function do not interfere with each other.

18 Claims, 7 Drawing Sheets

(51) Int. Cl.
*G02F 1/1333* (2006.01)
*G02F 1/1339* (2006.01)

(58) Field of Classification Search
CPC ....... G02F 1/13394; G02F 2001/13396; G06F 3/0412; G06F 3/044; G06F 3/0416; G06F 3/14; G06F 3/147; H01L 27/3262; H01L 29/78648; H01L 27/124; H01L 27/1214; G09G 3/36

See application file for complete search history.

(56) References Cited

U.S. PATENT DOCUMENTS

| | | | |
|---|---|---|---|
| 2007/0262967 A1* | 11/2007 | Rho | G02F 1/13338 345/173 |
| 2009/0115741 A1* | 5/2009 | Wang | G06F 3/044 345/173 |
| 2009/0237369 A1* | 9/2009 | Hur | G06F 3/0412 345/173 |
| 2010/0045635 A1* | 2/2010 | Soo | G06F 3/046 345/178 |
| 2010/0103121 A1* | 4/2010 | Kim | G06F 3/044 345/173 |
| 2010/0156827 A1* | 6/2010 | Joo | G02F 1/13338 345/173 |
| 2011/0063537 A1 | 3/2011 | Kim et al. | |
| 2011/0102698 A1* | 5/2011 | Wang | G02F 1/13338 349/54 |
| 2011/0187631 A1* | 8/2011 | Lee | G09G 3/36 345/87 |
| 2011/0304563 A1* | 12/2011 | Cheng | G06F 3/0412 345/173 |
| 2012/0105347 A1* | 5/2012 | Pak | G06F 3/0412 345/173 |
| 2013/0050126 A1 | 2/2013 | Kimura | |
| 2013/0176235 A1* | 7/2013 | Chou | G06F 3/0412 345/173 |
| 2014/0078154 A1* | 3/2014 | Payne e | G02B 26/02 345/501 |

FOREIGN PATENT DOCUMENTS

| | | |
|---|---|---|
| CN | 101510137 A | 8/2009 |
| CN | 101963715 A | 2/2011 |
| CN | 102707470 A | 10/2012 |
| CN | 103885223 A | 6/2014 |

* cited by examiner

--Prior Art--

TOUCH DISPLAY PANEL AND TOUCH DISPLAY DEVICE

CROSS-REFERENCES TO RELATED APPLICATIONS

This application is a United States National Phase Application of co-pending International Patent Application Number PCT/CN2014/071114, filed Jan. 22, 2014 and entitled "TOUCH DISPLAY PANEL AND TOUCH DISPLAY DEVICE", which Application claims priority to Chinese Patent Application Number 201310030355.0, filed with the Chinese Patent Office on Jan. 25, 2013, the contents of which are incorporated herein by reference in their entirety.

FIELD OF THE INVENTION

The present invention relates to the field of touch display, and particularly to a touch display panel and a touch display device.

BACKGROUND OF THE INVENTION

With the rapid development of mobile communication devices, especially with the development of smart phones in recent years, display panels with touch functions (referred to as touch display panels) have attracted more and more attention of major manufacturers. Currently, the touch display panels may be approximately divided into an external mounting type and an embedded type, according to different combination manners of touch structures and display structures. Compared with the external mounting touch display panels, the embedded touch display panels are relatively lighter and thinner and are popular with the manufacturers and consumers. At present, the touch structures in the embedded touch display panels are mainly capacitive touch structures or resistive touch structures. FIG. 1 is a structure schematic diagram of an embedded capacitive touch liquid crystal display panel in the prior art. The embedded capacitive touch liquid crystal display panel includes a color filter substrate 1 and a TFT (Thin Film Transistor) array substrate 2, which are disposed oppositely, and a liquid crystal layer 3 disposed between the color filter substrate 1 and the TFT array substrate 2. The color filter substrate 1 includes an upper substrate 4, a capacitive touch structure layer 5 and a color filter layer 6. In the embedded capacitive touch liquid crystal display panel, the capacitive touch structure layer is integrated on the color filter substrate of the liquid crystal display panel, so as to achieve embedded touch display. No matter in the embedded capacitive touch display panel or the embedded resistive touch display panel, the capacitive touch structure or the resistive touch structure needs to be prepared on the basis of preparation of the display structure, thus the production cost is higher and the process is quite complicated. In some technologies, the capacitive touch structure layer intends to be integrated in the TFT array substrate of the liquid crystal display panel, to synchronously manufacture the capacitive touch structure and a TFT array, so as to reduce the cost and simplify the process. However, when at work, the capacitive touch structure will affect the alignment of liquid crystals, thereby being unfavorable to the display of the liquid crystals.

To sum up, in the prior art, when at work, the capacitive touch structure integrated in the TFT array substrate will affect the alignment of the liquid crystals, thereby being unfavorable to the display of the liquid crystals.

BRIEF SUMMARY OF THE INVENTION

One inventive aspect is a touch display panel. The touch display panel includes a TFT array substrate, having a plurality of touch drive lines, a plurality of touch induction lines, and a plurality of touch TFTs, where one of the source electrode and the drain electrode of each touch TFT is electrically connected with one of the touch drive lines, and the other of the source electrode and the drain electrode of each touch TFT is electrically connected with one of the touch induction lines. The touch display panel also includes a color filter substrate, having a plurality of conductive spacers facing the TFT array substrate, where the conductive spacers are disposed so as to correspond with the touch TFTs for controlling the channel current of the touch TFTs.

Another inventive aspect is a touch display device, including a touch display panel. The touch display panel includes a TFT array substrate, having a plurality of touch drive lines, a plurality of touch induction lines, and a plurality of touch TFTs, where one of the source electrode and the drain electrode of each touch TFT is electrically connected with one of the touch drive lines, and the other of the source electrode and the drain electrode of each touch TFT is electrically connected with one of the touch induction lines. The touch display panel also includes a color filter substrate, having a plurality of conductive spacers facing the TFT array substrate, where the conductive spacers are disposed so as to correspond with the touch TFTs for controlling the channel current of the touch TFTs,

DETAILED DESCRIPTION OF THE INVENTION

Figure 1:
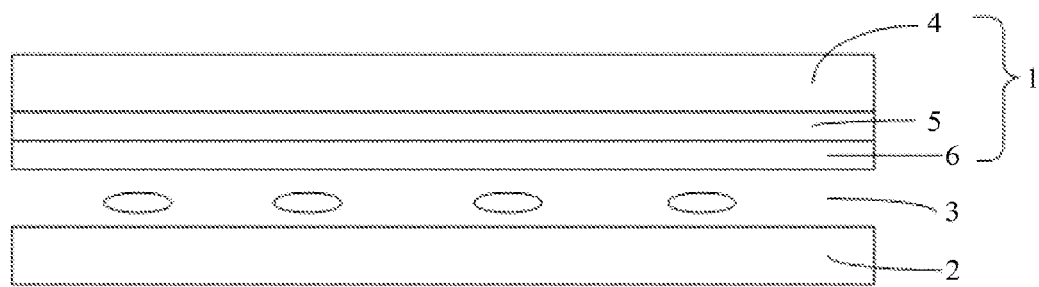
FIG. 1 is a schematic structural diagram of an embedded capacitive touch liquid crystal display panel in the prior art.

The core idea of the present invention is to achieve a touch function through a touch TFT array compatible with the structure and preparation process of a pixel array on a TFT array substrate, and the achievement of the touch function and the achievement of a display function are non-interfering. Specifically, embodiments of the present invention provide a touch display panel, including: a TFT array substrate and a color filter substrate, which are disposed oppositely;

the TFT array substrate includes a pixel array and a touch TFT array, wherein the touch TFT array includes: a plurality of touch drive lines; a plurality of touch induction lines; a plurality of touch TFTs, the source electrode/drain electrode (one of the source electrode and the drain electrode) of each touch TFT is electrically connected with one of the touch drive lines, and the drain electrode/source electrode (correspondingly, the other of the source electrode and the drain electrode) of each touch TFT is electrically connected with one of the touch induction lines;

the pixel array includes: a plurality of scanning lines; a plurality of data lines insulated and intersected with the plurality of scanning lines; and a plurality of pixel units, wherein each pixel unit is disposed in a pixel region enclosed by adjacent scanning lines and adjacent data lines. In general, a pixel unit includes a switch TFT and a pixel electrode; the gate electrode of the switch TFT is electrically connected with the scanning lines; the source electrode/drain electrode (one of the source electrode and the drain electrode) of the switch TFT is electrically connected with the data lines; the drain electrode/source electrode (correspondingly, the other of the source electrode and the drain electrode) of the switch TFT is electrically connected with the pixel electrode.

The color filter substrate includes: a plurality of conductive spacers disposed on the surface of the color filter substrate facing to the TFT array substrate, wherein the conductive spacers are disposed corresponding to the touch TFTs for controlling the channel current of the touch TFTs, so as to judge whether touch occurs.

In this way, when no touch occurs, the free end of each conductive spacer is away from each touch TFT far enough, and the channel current of each touch TFT is smaller than a preset threshold value and even is 0; when touch occurs, an object such as a finger or the like presses the color filter substrate, the conductive spacer at the pressing site approaches to the touch TFT with pressing, when the conductive spacer is close enough to the channel of the touch TFT (at this time, the touch TFT is not provided with a dedicated gate electrode, and the conductive spacer serves as the gate electrode actually), the touch TFT generates the channel current, and the channel current may be detected as long as being larger than the threshold value, to display the occurrence of touch at the site. When the touch occurs, the conductive spacer at the pressing site approaches to the touch TFT with pressing, the conductive spacer may also be electrically connected with the gate electrode (at this time, the touch TFT is provided with a dedicated top gate or bottom gate) of the touch TFT directly or indirectly, the electric potential of the conductive spacer is transmitted to the gate electrode of the touch TFT, to enable the touch TFT to generate the channel current, and when the channel current is larger than 0 or the threshold value, the channel current may also be detected, to display the occurrence of touch at the site.

In the touch display panel provided by the embodiments of the present invention, as the touch TFT is used for achieving touch, the touch principle thereof is completely different from the principles of the existing resistive touch and capacitive touch, no interference will be generated to the display when at work, and particularly, no adverse effect will be generated on the alignment of liquid crystals in a liquid crystal display panel. In addition, the preparation processes of the pixel array and the touch TFT for touch may be compatible, moreover, a part of or all of the two components may be located on the same layer and made from the same material, thereby saving the raw materials, such that the cost is greatly reduced.

As a preferred implementation way, in the touch display panel provided by other embodiments of the present invention, the touch drive lines for touch and the data lines for display may be shared, in this way, the integration degree of the touch structure and the display structure may be further improved.

The touch display device including the above-mentioned touch display panel provided by the embodiments of the present invention has corresponding advantages as well.

On the one hand, the touch display panel and the touch display device provided by the embodiments of the present invention have new display principles and achieve embedded touch display, so that the display panel is relatively light and thin; on the other hand, no additional structure component will be added on the basis of the display panel, no processing step is added and compatibility of the structure and the process is achieved, so that the cost is reduced; in a third aspect, when at work, the touch TFT will not affect the normal display of the display panel, thereby achieving the working compatibility of touch and display.

First Embodiment

Figure 2:
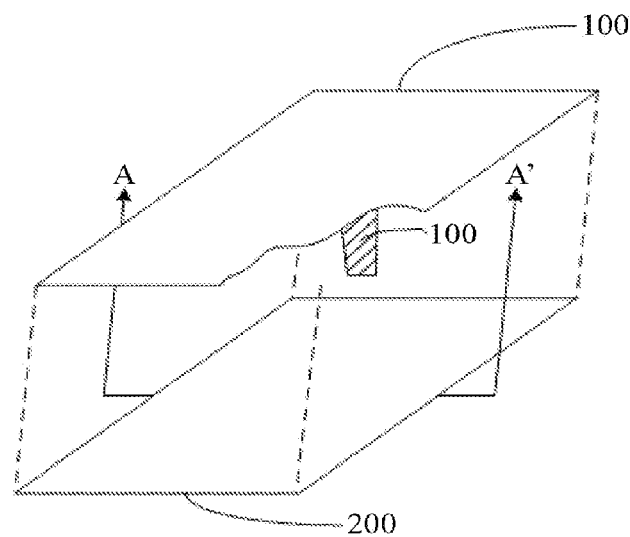
FIG. 2 is a solid schematic diagram of a touch display panel provided by an embodiment of the present invention.

The solid structure of a touch display panel provided by the first embodiment of the present invention is illustrated in FIG. 2. It can be seen from FIG. 2 that the touch display panel provided by the first embodiment of the present invention includes a TFT array substrate 200 and a color filter substrate 100, which are disposed oppositely. In general, the TFT array substrate 200 and the color filter substrate 100 are disposed in parallel and are bonded together by frame sealant (not shown in the figure) coated there between and located in a peripheral region. For different types of display panels, the space between the TFT array substrate 200 and the color filter substrate 100 may be vacuum or may be filled with gas, liquid and even colloid. For example, if the touch display panel is a touch liquid crystal display panel, liquid crystal molecules are filled between the TFT array substrate 200 and the color filter substrate 100; if the touch display panel is touch electronic paper, electronic ink is filled between the TFT array substrate 200 and the color filter substrate 100; if the touch display panel is a plasma display panel, gases capable of being converted into plasma are filled between the TFT array substrate 200 and the color filter substrate 100, and on the like.

The TFT array substrate 200 in the touch display panel provided by the first embodiment of the present invention includes a pixel array and a touch TFT array, and the pixel array and the touch TFT array are disposed to be mutually independent.

In this case, the touch TFT array includes: a plurality of touch drive lines; a plurality of touch induction lines;

a plurality of touch TFTs, wherein the source electrode/drain electrode of each touch TFT is electrically connected with one of the touch drive lines, and the drain electrode/source electrode of each touch TFT is electrically connected with one of the touch induction lines;

the pixel array includes: a plurality of scanning lines; a plurality of data lines intersected with the plurality of scanning lines in an insulated manner; a plurality of pixel units, each pixel unit being disposed in a pixel region enclosed by adjacent scanning lines and adjacent data lines. In general, each pixel unit includes a switch TFT and a pixel electrode; the gate electrode of the switch TFT is electrically connected with the scanning lines; the source electrode/drain electrode of the switch TFT is electrically connected with the data lines; the drain electrode/source electrode of the switch TFT is electrically connected with the pixel electrode.

In the color filter substrate in the touch display panel provided by the first embodiment of the present invention, a plurality of conductive spacers disposed corresponding to the touch TFTs are added on the basis of the traditional color filter substrate, for controlling the current of the touch TFTs to achieve a touch function.

Figure 3:
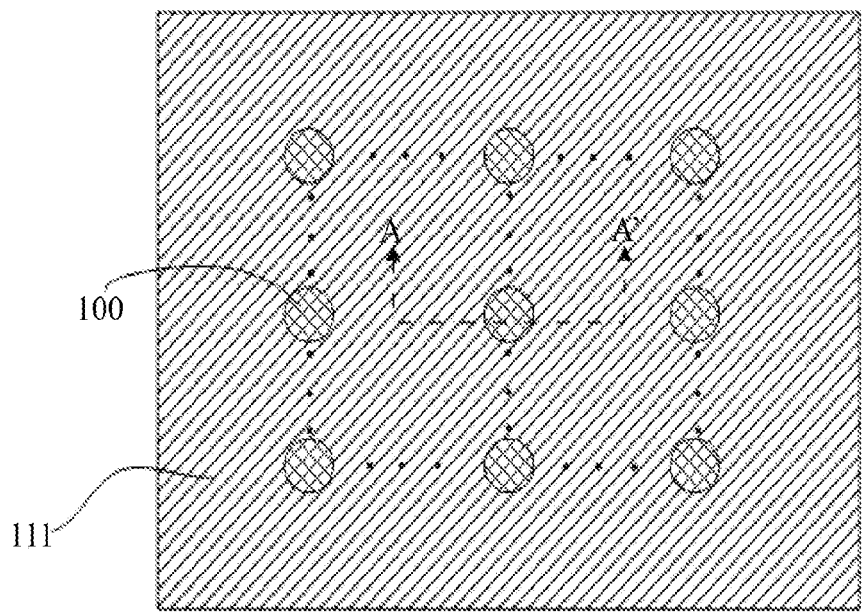
FIG. 3 is a schematic structural diagram in a top view of a color filter substrate provided by an embodiment of the present invention.

FIG. 3 is a schematic structural diagram in a top view of a color filter substrate provided by the first embodiment of the present invention. It can be seen from FIG. 3 that, the color filter substrate 100 includes: a plurality of conductive spacers 110 disposed on the surface of the touch display panel 100 facing to the TFT array substrate 200 and a first conductive layer 111 connected with the plurality of conductive spacers 110. The first conductive layer 111 is of an integral structure.

Figure 4:
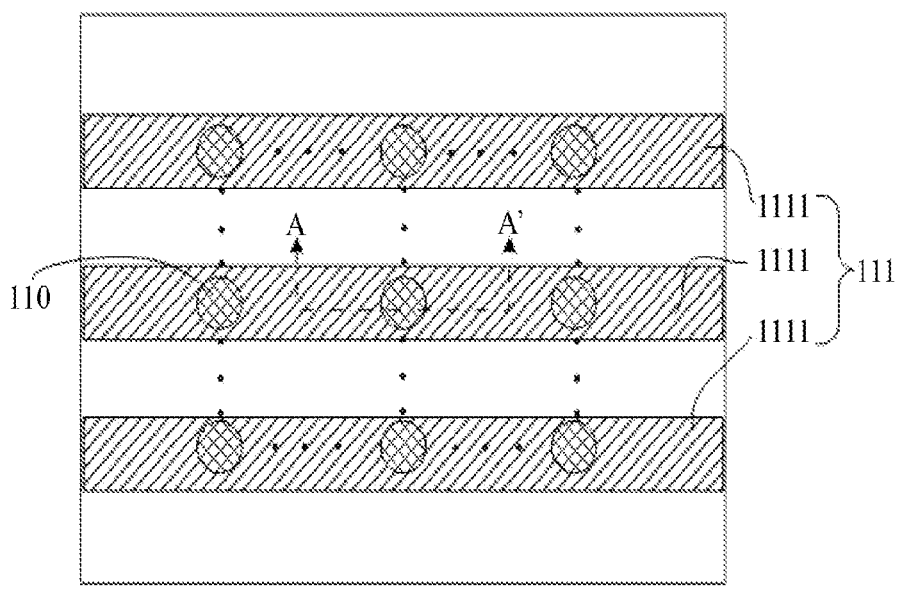
FIG. 4 is another schematic structural diagram in a top view of a color filter substrate provided by an embodiment of the present invention.

However, the first conductive layer 111 may be not of an integral structure, as shown in FIG. 4, the first conductive layer 111 includes a plurality of mutually separated first wires 1111, and each first wire 1111 is at least electrically connected with one conductive spacer 110. In general, the first wires 1111 are disposed in parallel and extend towards the same direction, and each first wire 1111 is connected with a line or a column of conductive spacers 110.

For the color filter substrate as shown in FIG. 3, the plurality of conductive spacers 110 thereon are electrically connected together by the integral conductive layer 111, in order to achieve the touch function, the touch drive lines are insulated and intersected with the touch induction lines (generally they are vertically intersected), and a touch coordinate may be determined by using the touch drive lines and the touch induction lines intersected in an insulated manner.

Figure 5:
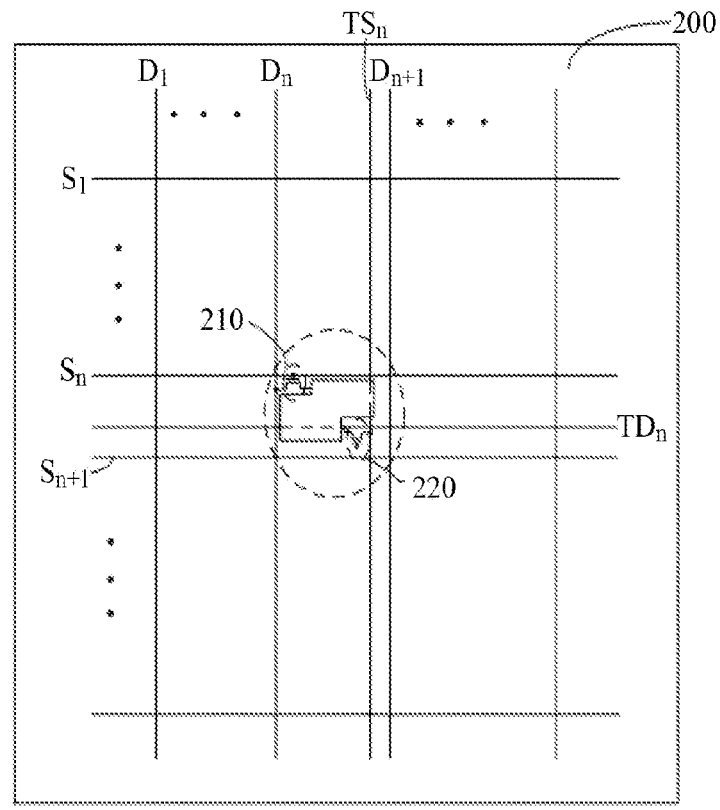
FIG. 5 is a schematic structural diagram in a top view of a TFT array substrate provided by an embodiment of the present invention.
Figure 6:
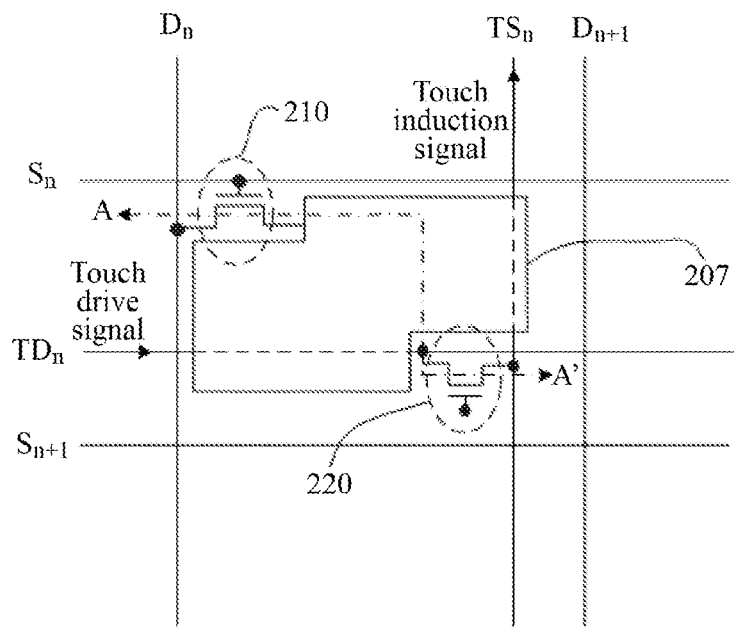
FIG. 6 is an enlarged view of a dotted line region in FIG. 5.

Specifically, FIG. 5 is a schematic structural diagram in a top view of a TFT array substrate in FIG. 2. FIG. 6 is an enlarged view of a dotted line region in FIG. 5. It can be seen from FIG. 5 and FIG. 6 that, the TFT array substrate 200 includes:

a plurality of touch drive lines TD ($TD_1$, $TD_2$, ..., $TD_a$, ...); a plurality of touch induction lines TS ($TS_1$, $TS_2$, ..., $TS_a$, ...).

The source electrode/drain electrode (one of the source electrode and the drain electrode) of a touch TFT 220 is electrically connected with the touch drive lines TD, and the drain electrode/source electrode (correspondingly, the other of the source electrode and the drain electrode) of the touch TFT 220 is electrically connected with the touch induction lines TS.

The TFT array substrate 200 further includes: a plurality of scanning lines S ($S_1$, ..., $S_n$, $S_{n+1}$, ...); a plurality of data lines D ($D_1$, $D_n$, $D_{n+1}$, ...) intersected and insulated with the plurality of scanning lines S ($S_1$, ..., $S_n$, $S_{n+1}$, ...); a plurality of pixel units, wherein each pixel unit is disposed in a pixel region enclosed by adjacent scanning lines S and adjacent data lines D. Each pixel unit includes a switch TFT 210 and a pixel electrode 207; the gate electrode of the switch TFT 210 is electrically connected with the scanning lines S; the source electrode/drain electrode of the switch TFT 210 is electrically connected with the data lines D; the drain electrode/source electrode of the switch TFT 210 is electrically connected with the pixel electrode 207.

In this case, the touch drive lines TD and the scanning lines S extend along the same direction and are vertical to the data lines D; the touch induction lines TS and the data lines D extend along the same direction and are vertical to the scanning lines S. Therefore, a touch coordinate of the touch display panel including the TFT array substrate 200 as shown in FIG. 5 and FIG. 6 may be determined by the touch drive lines TD and the touch induction lines TS intersected in an insulated manner.

In addition, the touch TFT 220 in FIG. 5 may be distributed in a plurality of manners, for example, one touch TFT is disposed in each pixel region; or one touch TFT is disposed in the pixel region every preset number of pixel units, specifically, one touch TFT may be disposed in the pixel region every other M pixel units in a direction parallel to the scanning lines, and one touch TFT may be disposed in the pixel region every other N pixel units in a direction parallel to the data lines, wherein both M and N are positive integers.

Figure 7:
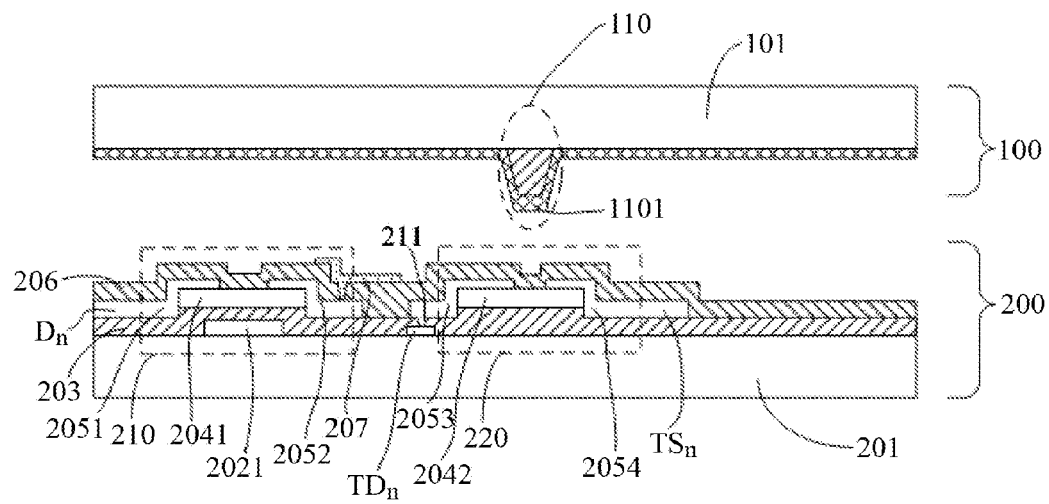
FIG. 7 is a schematic structural diagram in a section view, taken along A-A', of a touch display panel including the TFT array substrate as shown in FIG. 6.

FIG. 7 includes a schematic structural diagram in a section view, taken along A-A', of a touch display panel including the TFT array substrate as shown in FIG. 6. In combination with FIG. 3, FIG. 5, FIG. 6 and FIG. 7, it may be seen that the TFT array substrate 200 includes a lower substrate 201 and a pixel array located on the lower substrate 201.

The switch TFT 210 in the pixel unit is a bottom gate TFT and includes a first gate electrode 2021 located on the lower substrate 201, a first insulating layer (gate electrode insulating layer) 203 located on the first gate electrode 2021, a first active layer 2041 (which may be made from semiconductor material such as noncrystalline silicon material and the like, and may be single-layer or multilayer) located on the first insulating layer 203, a first source electrode 2051 and a first drain electrode 2052 located on the first active layer 2041, and a second insulating layer (passivation layer) 206 located above the first source electrode 2051 and the first drain electrode 2052, wherein the first source electrode 2051 and the first drain electrode 2052 are mutually separate and are electrically connected with the first active layer 2041 respectively; the first active layer 2041 between the first source electrode 2051 and the first drain electrode 2052 forms a channel; and the first gate electrode 2021 is located below the channel. The pixel electrode 207 is electrically connected with the first drain electrode 2052 through a via hole.

The touch TFT 220 includes a first insulating layer (gate electrode insulating layer) 203 located on the lower substrate 201, a second active layer 2042 (which may be made from semiconductor material, such as noncrystalline silicon material and the like, and may be single-layer or multilayer) located on the first insulating layer 203, a second source electrode 2053 and a second drain electrode 2054 located on the second active layer 2042, and a second insulating layer (passivation layer) 206 located above the second source electrode 2053 and the second drain electrode 2054, wherein the second source electrode 2053 and the second drain electrode 2054 are mutually separated and are electrically connected with the second active layer 2042 respectively; and the second active layer 2042 between the second source electrode 2053 and the second drain electrode 2054 forms a channel.

The pixel electrode 207 is connected with the first drain electrode 2052 through a via hole; the second source electrode 2053 is connected with the touch drive lines TD through a via hole 211; the second drain electrode 2054 is directly connected with the touch induction lines TS on the same layer.

It should be noted that, the above-mentioned "located on . . . " means that both sides may be in direct contact or may also be in indirect contact, for example, the expression "a first gate electrode 2021 located on the lower substrate 201" means that the lower substrate 201 and the first gate electrode 2021 may be in direct contact or may also be in indirect contact. The expressions "located on . . . " involved at other places in this application document may refer to this explanation.

In combination with FIG. 5, FIG. 6 and FIG. 7, it may be also seen that the first gate electrode 2021, the scanning lines S and the touch drive lines TD are located on the same layer and are made from the same material; the scanning lines S and the touch drive lines TD extend towards the same direction (first direction). The first source electrode 2051, the first drain electrode 2052, the second source electrode 2053, the second drain electrode 2054, the data lines D and the touch induction lines TS are located on the same layer and are made from the same material; the data lines D and the touch induction lines TS extend towards the same direction (second direction), wherein the first direction and the second direction are intersected (generally, may be vertically intersected). The touch TFT 220 and the switch TFT 210 share the first insulating layer 203 and the second insulating layer 206.

It may be seen that, on a layered structure, the pixel array and the touch TFT array are compatible and may be synchronously manufactured. Specifically, the structure of the touch TFT 220 is corresponding to the structure of the switch TFT 210, and the former is provided with only one more bottom gate than the latter. The structure of each part of the touch TFT has a corresponding structure in the switch TFT 210, and the both sides are located on the same layer, are made from the same material and may be synchronously prepared in the same processing step. In addition, the touch drive lines TD of the touch TFT array and the scanning lines S of the pixel array are located on the same layer, are made from the same material and may be synchronously prepared in the same processing step; the touch induction lines TS of the touch TFT array and the data lines D of the pixel array are located on the same layer, are made from the same material and may be synchronously prepared in the same processing step.

It should be noted that, in the above-mentioned description of FIG. 7, 2051 refers to the source electrode of the switch TFT 210 and 2052 refers to the drain electrode of the switch TFT 210; but it should be known by those of ordinary skill in the art that 2051 may refer to the drain electrode of the switch TFT 210 and 2052 may refer to the source electrode of the switch TFT 210. Similarly, 2053 may refer to the drain electrode of the touch TFT 220 and 2054 may refer to the source electrode of the touch TFT 220.

In combination with FIG. 3, FIG. 5, FIG. 6 and FIG. 7, the touch working process of the first embodiment of the present invention is illustrated as follows.

In combination with FIG. 6 and FIG. 7, for one touch TFT 220, when no touch occurs, the free end 1101 of the conductive spacer 110 does not contact the TFT array substrate 200, and the distance is far enough, the electric field of the conductive spacer 110 could not control the touch TFT 220 and drive the same to generate channel current, at this time, no touch induced current is detected (namely, the channel current is 0); when touch occurs, the conductive spacer 110 approaches to the TFT array substrate 200 with pressing and is close enough to the channel of the touch TFT 220 (generally, the conductive spacer contacts the passivation layer above the channel, namely, the conductive spacer is isolated from an active layer in the channel region through an insulating layer), so that the touch TFT 220 generates the channel current. Preferably, the electric potential of the conductive spacer 110 is disposed to be high enough in general, to ensure that when the conductive spacer 110 contacts the passivation layer above the channel of the TFT 220, the TFT 220 generates channel current I, and the channel current I may be detected. A threshold value T is preset, which is larger than 0 and is smaller than the channel current I; when the detected channel current is smaller than the threshold value T, it is judged that no touch occurs; and when the detected channel current is larger than the threshold value T, it is judged that touch occurs. When the channel current is equal to the threshold value T, it may be judged that no touch occurs or it may also be judged that touch occurs.

It should be further noted that, in the section structure of the touch display panel as shown in FIG. 7, the switch TFT 210 in the pixel unit is a bottom gate TFT. However, the switch TFT 210 in the pixel unit may also be a top gate TFT (not shown in the figure).

Second Embodiment

Figure 8:
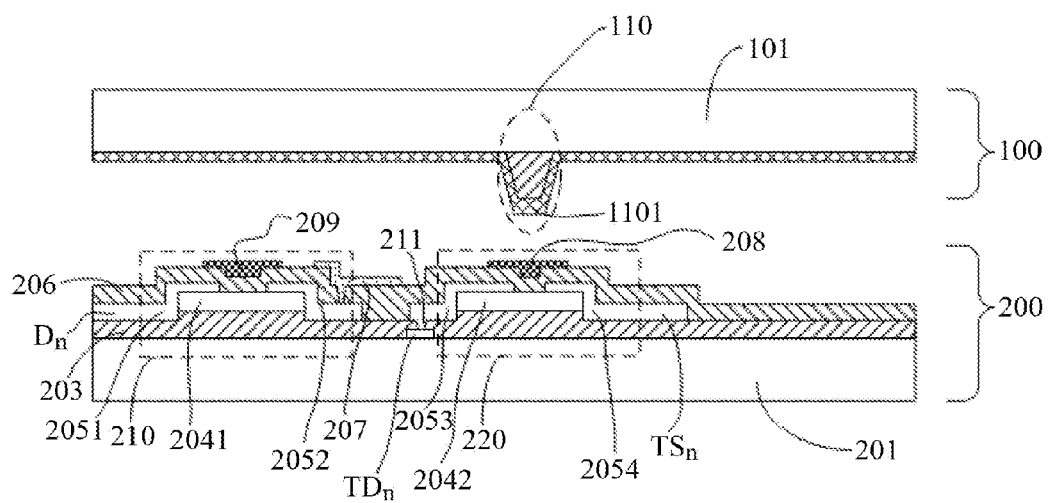
FIG. 8 is another schematic structural diagram in a section view, taken along A-A', of a touch display panel including the TFT array substrate as shown in FIG. 6.

In the first embodiment of the present invention, the touch TFT included in the TFT array substrate is provided with no gate electrode, the conductive spacer 110 serves as the gate electrode of the touch TFT substantially. In the second embodiment provided by the present invention, the touch TFT included in the TFT array substrate is provided with a top gate, in combination with FIG. 2, FIG. 3, FIG. 5, FIG. 6 and FIG. 8, the parts the same as the first embodiment are not repeated redundantly and are specifically as follows:

FIG. 8 is another schematic structural diagram in a section view, taken along A-A', of a touch display panel including the TFT array substrate as shown in FIG. 6. In combination with FIG. 3, FIG. 5, FIG. 6 and FIG. 8, it may be seen that the TFT array substrate 200 includes a lower substrate 201 and a TFT array located on the lower substrate 201.

The switch TFT 210 in the pixel unit is a top gate TFT and includes a first insulating layer (gate electrode insulating layer) 203 located on the lower substrate 201, a first active layer 2041 (which may be made from low temperature polycrystalline silicon material or oxide semiconductor material, for example, IGZO (Indium Gallium Zinc Oxide) or other semiconductor material, and may be single-layer or multilayer) located on the first insulating layer 203, a first source electrode 2051 and a first drain electrode 2052 located on the first active layer 2041, and a second insulating layer (passivation layer) 206 located above the first source electrode 2051 and the first drain electrode 2052, wherein the first source electrode 2051 and the first drain electrode 2052 are mutually separated and are electrically connected with the first active layer 2041 respectively; the first active layer 2041 between the first source electrode 2051 and the first drain electrode 2052 forms a channel; a first gate electrode 209 (top gate) is located above the channel; the pixel electrode 207 is located on the second insulating layer 206 and is connected with the first drain electrode 2052 through a via hole.

The touch TFT 220 includes a first insulating layer (gate electrode insulating layer) 203 located on the lower substrate 201, a second active layer 2042 (may be made from low temperature polycrystalline silicon material or oxide semiconductor material, for example, IGZO (Indium Gallium Zinc Oxide) or other semiconductor materials, and may be single-layer or multilayer) located on the first insulating layer 203, a second source electrode 2053 and a second drain electrode 2054 located on the second active layer 2042, a second insulating layer (passivation layer) 206 located above the second source electrode 2053 and the second drain electrode 2054, and a second gate electrode 208 (top gate) located above the second insulating layer 206, wherein the second source electrode 2053 and the second drain electrode 2054 are mutually separated and are electrically connected with the second active layer 2042 respectively; the second active layer 2042 between the second source electrode 2053 and the second drain electrode 2054 forms a channel; the second gate electrode 208 is located above the channel and is insulated with the second active layer 2042, the second source electrode 2053 and the second drain electrode 2054.

The pixel electrode 207 is electrically connected with the first drain electrode 2052 through a via hole; the second source electrode 2053 is connected with the touch drive lines TD through a via hole 211; the second drain electrode 2054 is directly connected with the touch induction lines TS on the same layer.

In combination with FIG. 5, FIG. 6 and FIG. 8, it may be also seen that the scanning lines S and the touch drive lines TD are located on the same layer and are made from the same material; the scanning lines S and the touch drive lines TD extend towards the same direction (first direction). The first source electrode 2051, the first drain electrode 2052, the second source electrode 2053, the second drain electrode 2054, the data lines D and the touch induction lines TS are located on the same layer and are made from the same material; the data lines D and the touch induction lines TS extend towards the same direction (second direction), wherein the first direction and the second direction are intersected (generally, may be vertically intersected). The first gate electrode 209 and the second gate electrode 208 are located on the same layer and are made from the same material. The touch TFT 220 and the switch TFT 210 share the first insulating layer 203 and the second insulating layer 206.

It may be seen that, on a layered structure, the pixel array and the touch TFT array are compatible and may be synchronously manufactured. Specifically, the structure of the touch TFT 220 is the same as that of the switch TFT 210. The structure of each part of the touch TFT has a corresponding structure in the switch TFT 210, and the both sides are located on the same layer, are made from the same material and may be synchronously prepared in the same processing step. In addition, the touch drive lines TD of the touch TFT array and the scanning lines S of the pixel array are located on the same layer, are made from the same material and may be synchronously prepared in the same processing step; the touch induction lines TS of the touch TFT array and the data lines D of the pixel array are located on the same layer, are made from the same material and may be synchronously prepared in the same processing step.

In combination with FIG. 3, FIG. 5, FIG. 6 and FIG. 8, the touch working process of the second embodiment of the present invention is illustrated as follows:

in combination with FIG. 6 and FIG. 8, for one touch TFT 220, when no touch occurs, the free end 1101 of the conductive spacer 110 does not contact the second gate electrode 208, the electric field of the conductive spacer 110 could not control the touch TFT 220 and drive the same to generate channel current, at this time, no touch induced current is detected (namely, the channel current is 0); when touch occurs, the conductive spacer 110 approaches to the TFT array substrate 200 with pressing and contacts the second gate electrode 208 of the touch TFT 220, to enable the touch TFT 220 to generate the channel current. Preferably, the electric potential of the conductive spacer 110 is disposed to be high enough in general, to ensure that when the conductive spacer 110 contacts the second gate electrode 208 of the touch TFT 220, the TFT 220 generates channel current I, and the channel current I may be detected. A threshold value T is preset, which is larger than 0 and is smaller than the channel current I; when the detected channel current is smaller than the threshold value T, it is judged that no touch occurs; when the detected channel current is larger than the threshold value T, it is judged that touch occurs. When the channel current is equal to the threshold value T, it may be judged that no touch occurs or it may also be judged that touch occurs.

It should be further noted that, in the schematic structural diagram in a section view of the touch display panel as shown in FIG. 8, the switch TFT 210 in the pixel unit is a top gate TFT. However, the switch TFT 210 in the pixel unit may also be a bottom gate TFT (not shown in the figure). In addition, the conductive spacer 110 is unnecessary to be located right above the second gate electrode 208 of the touch TFT 220, as long the conductive spacer 110 may be electrically connected with the second gate electrode 208 of the touch TFT 220 when touch occurs. For example, the second gate electrode 208 is extended to form an extension part (not shown in the figure), and the conductive spacer 110 is located right above the extension part.

Third Embodiment

In the first embodiment of the present invention, the touch TFT included in the TFT array substrate is provided with no gate electrode, the conductive spacer 110 serves as the gate electrode of the touch TFT substantially; in the second embodiment of the present invention, the touch TFT included in the TFT array substrate is provided with a top gate; in the third embodiment of the present invention, the touch TFT included in the TFT array substrate is provided with a bottom gate; in combination with FIG. 2, FIG. 3, FIG. 5, FIG. 6 and FIG. 9, the parts the same as the first embodiment and the second embodiment are not repeated redundantly and are specifically as follows.

Figure 9:
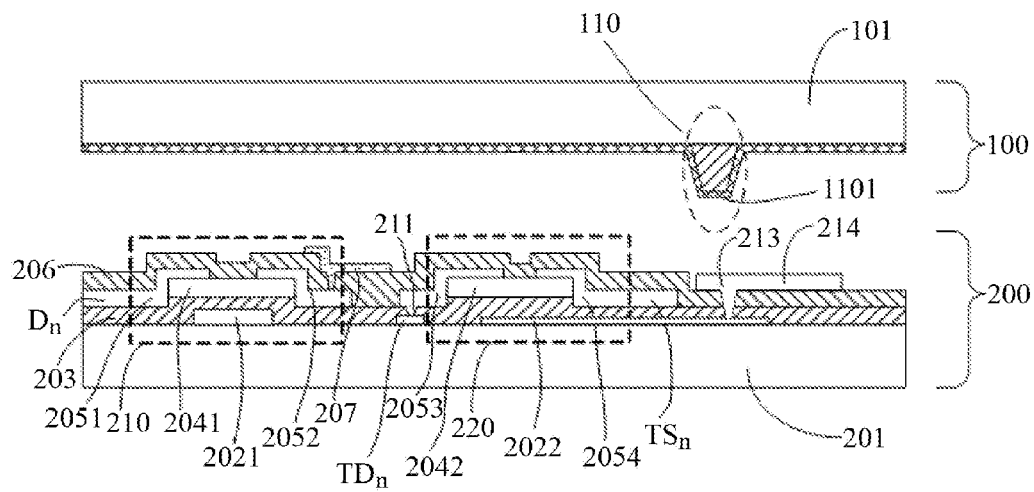
FIG. 9 is a third schematic structural diagram in a section view, taken along A-A', of a touch display panel including the TFT array substrate as shown in FIG. 6.

FIG. 9 is a third schematic structural diagram in a section view, taken along A-A', of a touch display panel including the TFT array substrate as shown in FIG. 6 along A-A'. In combination with FIG. 3, FIG. 5, FIG. 6 and FIG. 9, it may be seen that the TFT array substrate 200 includes a lower substrate 201 and a TFT array located on the lower substrate 201.

The switch TFT 210 in the pixel unit is a bottom gate TFT and includes a first gate electrode 2021 located on the lower substrate 201, a first insulating layer (gate electrode insulating layer) 203 located on the first gate electrode 2021, a first active layer 2041 (which may be made from semiconductor material, such as noncrystalline silicon material and the like, and may be single-layer or multilayer) located on the first insulating layer 203, a first source electrode 2051 and a first drain electrode 2052 located on the first active layer 2041, and a second insulating layer (passivation layer) 206 located above the first source electrode 2051 and the first drain electrode 2052, wherein the first source electrode 2051 and the first drain electrode 2052 are mutually separated and are electrically connected with the first active layer 2041 respectively; the first active layer 2041 between the first source electrode 2051 and the first drain electrode 2052 forms a channel; and the first gate electrode 2021 is located below the channel. The pixel electrode 207 is electrically connected with the first drain electrode 2052 through a via hole.

The touch TFT 220 includes a second gate electrode 2022 (bottom gate) located on the lower substrate 201, a first insulating layer (gate electrode insulating layer) 203 located on the second gate electrode 2022, a second active layer 2042 (which may be made from semiconductor material, such as a noncrystalline silicon material and the like, and may be single-layer or multilayer) located on the first insulating layer 203, a second source electrode 2053 and a second drain electrode 2054 located on the second active layer 2042, and a second insulating layer (passivation layer) 206 located above the second source electrode 2053 and the second drain electrode 2054, wherein the second source electrode 2053 and the second drain electrode 2054 are mutually separated and are electrically connected with the second active layer 2042 respectively; the second active layer 2042 between the second source electrode 2053 and the second drain electrode 2054 forms a channel; the second gate electrode 2022 is located below the channel and is insulated with the second active layer 2042, the second source electrode 2053 and the second drain electrode 2054.

The pixel electrode 207 is electrically connected with the first drain electrode 2052 through a via hole; the second source electrode 2053 is connected with the touch drive lines TD through a via hole 211; the second drain electrode 2054 is directly connected with the touch induction lines TS on the same layer. In addition, the TFT array substrate 200 further includes a touch electrode 214 located on the surface layer thereof and an extension part of the second gate electrode 2022; the touch electrode 214 is connected with the extension part of the second gate electrode 2022 through a via hole 213 penetrating through the first insulating layer 203 and the second insulating layer 206.

In combination with FIG. 5, FIG. 6 and FIG. 9, it may be also seen that the first gate electrode 2021, the second gate electrode 2022, the scanning lines S and the touch drive lines TD are located on the same layer and are made from the same material; and the scanning lines S and the touch drive lines TD extend towards the same direction (first direction). The first source electrode 2051, the first drain electrode 2052, the second source electrode 2053, the second drain electrode 2054, the data lines D and the touch induction lines TS are located on the same layer and are made from the same material; the data lines D and the touch induction lines TS extend towards the same direction (second direction), wherein the first direction and the second direction are intersected (generally, may be vertically intersected). The first gate electrode 2021 and the second gate electrode 2022 are located on the same layer and are made from the same material. The touch TFT 220 and the switch TFT 210 share the first insulating layer 203 and the second insulating layer 206.

It thus may be seen that, on a layered structure, the pixel array and the touch TFT array are compatible and may be synchronously manufactured. Specifically, the structure of the touch TFT 220 is the same as the structure of the switch TFT 210. The structure of each part of the touch TFT has a corresponding structure in the switch TFT 210, and the both sides are located on the same layer, are made from the same material and may be synchronously prepared in the same processing step. In addition, the touch drive lines TD of the touch TFT array and the scanning lines S of the pixel array are located on the same layer, are made from the same material and may be synchronously prepared in the same processing step; the touch induction lines TS of the touch TFT array and the data lines D of the pixel array are located on the same layer, are made from the same material and may be synchronously prepared in the same processing step. The touch electrode 214 and the pixel electrode 207 may be located on the same layer, may be made from the same material and may be synchronously prepared in the same processing step.

In combination with FIG. 3, FIG. 5, FIG. 6 and FIG. 9, the touch working process of the third embodiment of the present invention is illustrated as follows:

in combination with FIG. 6 and FIG. 9, for one touch TFT 220, when no touch occurs, the free end 1101 of the conductive spacer 110 does not contact the touch electrode 214, the electric field of the conductive spacer 110 could not control the touch TFT 220 and drive the same to generate channel current, at this time, no touch induced current is detected (namely, the channel current is 0); when touch occurs, the conductive spacer 110 approaches to the TFT array substrate 200 with pressing and contacts the touch electrode 214 of the touch TFT 220, to enable the touch TFT 220 to generate the channel current. Preferably, the electric potential of the conductive spacer 110 is disposed to be high enough in general, to ensure that when the conductive spacer 110 contacts the touch electrode 214 of the touch TFT 220, the TFT 220 generates channel current I, and the channel current I may be detected. A threshold value T is preset, the threshold value T is larger than 0 and is smaller than the channel current I; when the detected channel current is smaller than the threshold value T, it is judged that no touch occurs; when the detected channel current is larger than the threshold value T, it is judged that touch occurs. When the channel current is equal to the threshold value T, it may be judged that no touch occurs or it may also be judged that touch occurs.

It should be further noted that, in the schematic structural diagram in a section view of the touch display panel as shown in FIG. 9, the switch TFT 210 in the pixel unit is a bottom gate TFT. However, the switch TFT 210 in the pixel unit may also be a top gate TFT (not shown in the figure).

Fourth Embodiment

In the above-mentioned first embodiment, second embodiment and third embodiment, the conductive layer 111 on the color filter substrate is of an integral structure, thus the touch drive lines TD and the touch induction lines TS need to be intersected and insulated to determine the touch coordinate (namely, the coordinate at the touch site). While in the fourth embodiment of the present invention, the color filter substrate as shown in FIG. 4 is adopted, the conductive layer 111 connected with a plurality of conductive spacers 110 thereon includes a plurality of mutually separated first wires 1111, and each first wire 1111 is at least electrically connected with one conductive spacer 110. In general, the first wires 1111 are disposed in parallel, and each first wire 1111 is connected with a line or a column of conductive spacers 110. Then, as long as at least two of the touch drive lines TD, the touch induction lines TS and the first wires 1111 are intersected and insulated, the touch coordinate may be determined by use of the two insulated intersected ones. In general, there are two manners, in the first manner, the first wires 1111 are not adopted to determine the touch coordinate, namely, the first wires 1111 extend towards any direction, and the touch drive lines TD and the touch induction lines TS are intersected and insulated to determine the touch coordinate. This is different from the manner for determining the touch coordinate after the color filter substrate as shown in FIG. 3 is adopted.

In the second manner, the first wires 1111 are adopted to determine the touch coordinate, namely, the first wires 1111 are intersected in an insulated manner (mutually vertical in general) with any one of the touch drive lines TD and the touch induction lines TS, while the rest randomly extends (in general, may extend along the same direction as the first wires 1111).

Therefore, the touch coordinate of the touch display panel adopting the color filter substrate as shown in FIG. 4 may be determined by use of two insulated intersected ones among the touch drive lines TD, the touch induction lines TS and the first wires 1111. The TFT array substrate of the touch display panel adopting the color filter substrate as shown in FIG. 4 may have the same structure as the TFT array substrate (as shown in FIG. 5 to FIG. 9) of the touch display panel adopting the color filter substrate as shown in FIG. 3, and will not be repeated redundantly herein.

To sum up, in the touch display panel provided by the first embodiment, the second embodiment, the third embodiment and the fourth embodiment of the present invention, the pixel array and the touch TFT array are mutually disposed independently and are structurally compatible. The switch TFT 210 in the pixel unit may be a bottom gate TFT or may also be a top gate TFT; the active layers in the switch TFT 210 and the touch TFT 220 may be made from a variety kinds of semiconductor material, for example, noncrystalline silicon, polycrystalline silicon, oxide semiconductor or the like; the layered structure may have a variety of different designs; the conductive spacer and the touch TFT 220 may be disposed in an alignment manner or may also be disposed in a non-alignment manner; any two insulated intersected ones among the touch drive lines TD, the touch induction lines TS and the first wires 111 may be adopted to determine the touch coordinate. FIG. 7 (or FIG. 9) and FIG. 8 merely show two typical TFT structures. However, from the core idea of the present invention, the structures of the switch TFT and the touch TFT in the present invention are not limited to those as shown in FIG. 7 (or FIG. 9) and FIG. 8. Meanwhile, if the structures of the switch TFT and the touch TFT adopt other designs, the position relationships of the scanning lines and the data lines of the pixel array with the touch drive lines and the touch induction lines of the touch TFT array may be properly adjusted according to the common knowledge in the art.

In addition, in the touch display panel provided by the first embodiment, the second embodiment, the third embodiment and the fourth embodiment of the present invention, the color filter substrate may have a variety of different structures.

Figure 10:
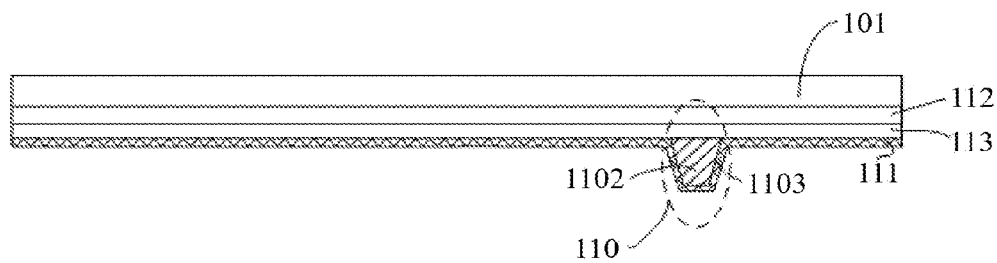
FIG. 10 is a first schematic structural diagram in a section view of a color filter substrate provided by an embodiment of the present invention.

FIG. 10 is a first schematic structural diagram in a section view of a color filter substrate provided by an embodiment of the present invention. It can be seen from FIG. 10 that the color filter substrate 100 includes an upper substrate 101, and a black matrix layer 112, a color filter layer 113, a conductive spacer 110 and a first conductive layer 111, which are located on the upper substrate 101 in sequence. The conductive spacer 110 includes an insulating column 1102 and a second conductive layer 1103 located on the surface of the insulating column 1102; the first conductive layer 111 is connected with the second conductive layer 1103. As a preferred implementation way, the first conductive layer 111 and the second conductive layer 1103 may be located on the same layer, made from the same material (such as ITO, IZO and other transparent conductive material) and formed in the same processing step.

Figure 11:
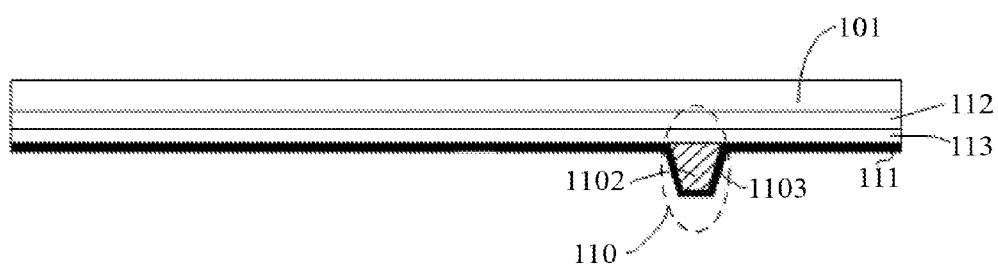
FIG. 11 is a second schematic structural diagram in a section view of a color filter substrate provided by an embodiment of the present invention.

In FIG. 10, the first conductive layer 111 and the second conductive layer 1103 are transparent, thus an additional black matrix layer 112 is needed to prevent light leakage. But in the touch display panel provided by the first embodiment of the present invention, the color filter substrate may also adopt the structure as shown in FIG. 11. In FIG. 11, the first conductive layer 111 and/or the second conductive layer 1103 is a mesh-shaped metal layer and is shielded by the black matrix layer 112. As a further preferred manner, the black matrix layer 112 may be omitted, and the mesh-shaped metal layer is directly used as a black matrix.

Figure 12:
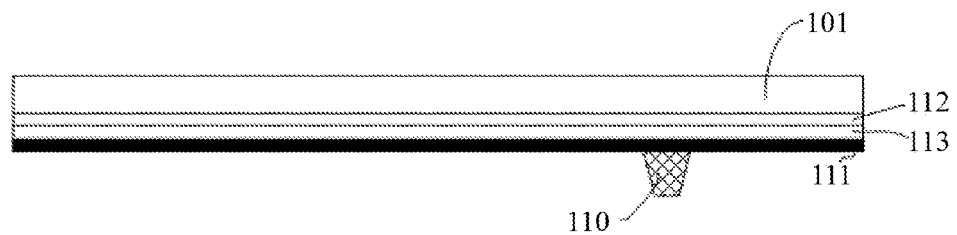
FIG. 12 is a third schematic structural diagram in a section view of a color filter substrate provided by an embodiment of the present invention.

In FIG. 10, the conductive spacer 110 includes the insulating column 1102 and the second conductive layer 1103 located on the surface of the insulating column 1102, but the conductive spacer may also adopt the structure as shown in FIG. 12. It can be seen from FIG. 12 that the color filter substrate 100 includes the upper substrate 101, and the black matrix layer 112, the color filter layer 113, the first conductive layer 111 and the conductive spacer 110, which are located on the upper substrate 101 in sequence. The conductive spacer 110 is made from conductive organic material. The first conductive layer 111 may be made from transparent conductive material such as ITO, IZO and the like and may also adopt the mesh-shaped metal layer shielded by the black matrix. As a further preferred manner, the black matrix layer 112 may be omitted, and the mesh-shaped metal layer is directly used as the black matrix, namely, the first conductive layer 111 is a conductive black matrix, at this time, the black matrix is located between the color filter layer and the conductive spacer.

Figure 13:
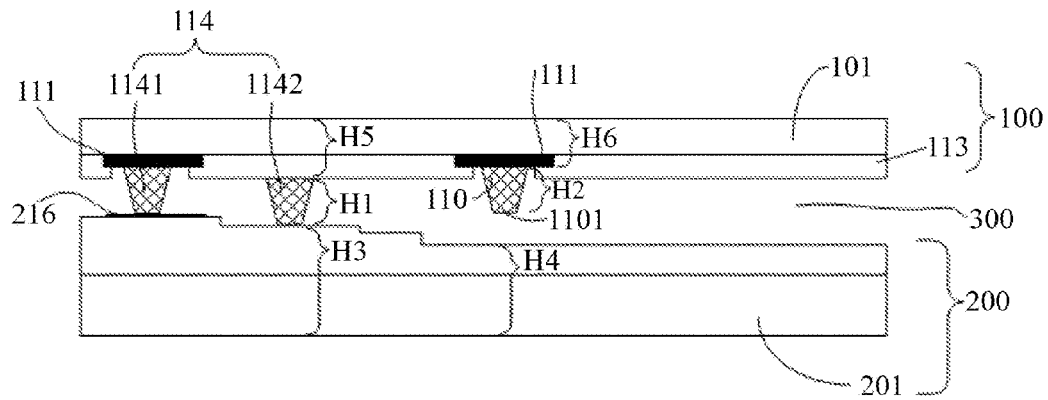
FIG. 13 is a fourth schematic structural diagram in a section view of a color filter substrate provided by an embodiment of the present invention.

In addition, as shown in FIG. 13, the color filter substrate 100 includes the upper substrate 101 and the color filter layer 113, and the black matrix layer 112 is located between the upper substrate 101 and the color filter layer 113. The color filter layer is a color carrier array composed of a plurality of color carrier units (R, G, B and the like), and the black matrix layer 112 covers the region between the adjacent color carrier units. The conductive spacer 110 is made from the conductive organic material and is directly disposed on the conductive black matrix layer 112.

To sum up, in the touch display panel provided by the embodiment of the present invention, the color filter substrate includes the conductive spacer and the first conductive layer electrically connected with the conductive spacer; the specific structures and position relationships of the conductive spacer, the first conductive layer and other structures (e.g., the upper substrate, the black matrix, the color filter layer or the like) of the color filter substrate may have a variety of designs and are not limited to those as shown in FIG. 10 to FIG. 13. In addition, the top view corresponding to the section structure as shown in FIG. 10 to FIG. 13 may be FIG. 3 or may also be FIG. 4.

Figure 14:
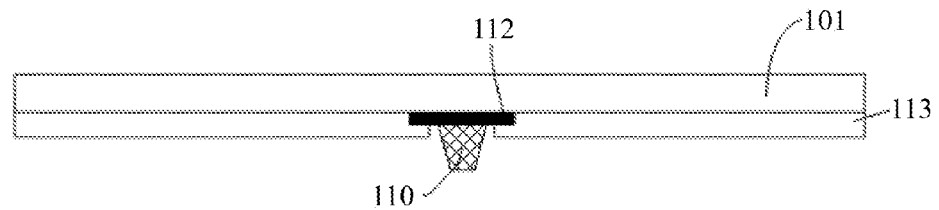
FIG. 14 is a schematic structural diagram in a section view of a touch display panel including a main spacer and conductive spacers provided by an embodiment of the present invention.

It is mentioned in the foregoing descriptions of FIG. 2 that, in the touch display panel provided by the first embodiment, the second embodiment, the third embodiment and the fourth embodiment of the present invention, the color filter substrate 100 and the TFT array substrate 200 are disposed oppositely and are bonded together by frame sealant (not shown in the figure) located on the periphery of the touch display panel. In order to maintain the stable distance between the color filter substrate 100 and the TFT array substrate 200, a main spacer for maintaining the stable distance there between needs to be disposed between the color filter substrate 100 and the TFT array substrate 200. As shown in FIG. 14, the touch display panel provided by the first embodiment, the second embodiment, the third embodiment and the fourth embodiment of the present invention further includes a main spacer 114 besides the conductive spacer 110. When no touch occurs, the two ends of the main spacer 114 respectively contact the TFT array substrate 200 and the color filter substrate 100, and the free end 1101 of the conductive spacer 110 does not contact the TFT array substrate 200. In this way, even if being pressed by an external force, the main spacer 114 may also maintain the stable distance between the color filter substrate 100 and the TFT array substrate 200. In addition, the main spacer 114 may be made from the same material as the conductive spacer 110 and may be prepared in the same processing step. Therefore, the length H1 of the main spacer 114 itself may be equal to the length H2 of the conductive spacer 110. But during design, the thickness H3 of the TFT array substrate 200 at the site aligned to the main spacer 114 is larger than the thickness H4 of the TFT array substrate 200 at the site aligned to the conductive spacer 110; and/or the thickness H5 of the color filter substrate 100 at the site aligned to the main spacer 114 is larger than the thickness H6 of the color filter substrate 100 at the site aligned to the conductive spacer 110.

As a preferred implementation way, the main spacer 114 may be divided into a first main spacer 1141 and a second main spacer 1142. Taking the color filter substrate shown in FIG. 13 as an example (of course, the color filter substrate as shown in FIG. 10 to FIG. 12 may also be taken as an example), the first main spacer 1141 is made from a conductive material, the upper end thereof is connected with the first conductive layer 111 (in the figure, it is taken as example that the first conductive layer 111 is also used as the black matrix 112) on the color filter substrate 100, and the lower end thereof is connected with a signal input end 216 on the TFT array substrate 200; in this way, the first main spacer 1141 transmits an external drive signal or a fixed voltage from the TFT array substrate 200 to the first conductive layer 111 on the color filter substrate 100, so as to provide a signal for touch. The second main spacer 1142 is in insulated contact with the color filter substrate 100 and/or the TFT array substrate 200 and merely functions as supporting. In addition, for the touch liquid crystal display panel, the color filter substrate 100 and the TFT array substrate 200 are further provided with a liquid crystal layer 300, the first main spacer 1141 may be located in the frame sealant, may also be located on the side of the frame sealant close to the liquid crystal layer 300 or may also be located on the side of the frame sealant away from the liquid crystal layer 300 (not shown in the figure).

In addition, the touch display panel provided by the first embodiment, the second embodiment, the third embodiment and the fourth embodiment of the present invention further includes a scanning drive circuit electrically connected with the scanning lines, a data drive circuit electrically connected with the data lines, a touch drive signal generating circuit electrically connected with the touch drive lines and a touch detecting circuit electrically connected with the touch induction lines.

Fifth Embodiment

The solid structure of the touch display panel provided by the fifth embodiment of the present invention may still refer to FIG. 2, for the sake of conciseness, similarities with the first embodiment, the second embodiment, the third embodiment and the fourth embodiment will not be repeatedly illustrated. The TFT array substrate 200 in the touch display panel provided by the fifth embodiment of the present invention includes a pixel array and a touch TFT array, the pixel array and the touch TFT array are not disposed independently, while the data lines of the pixel array and the touch drive lines of the touch TFT array share the same line.

Figure 15:
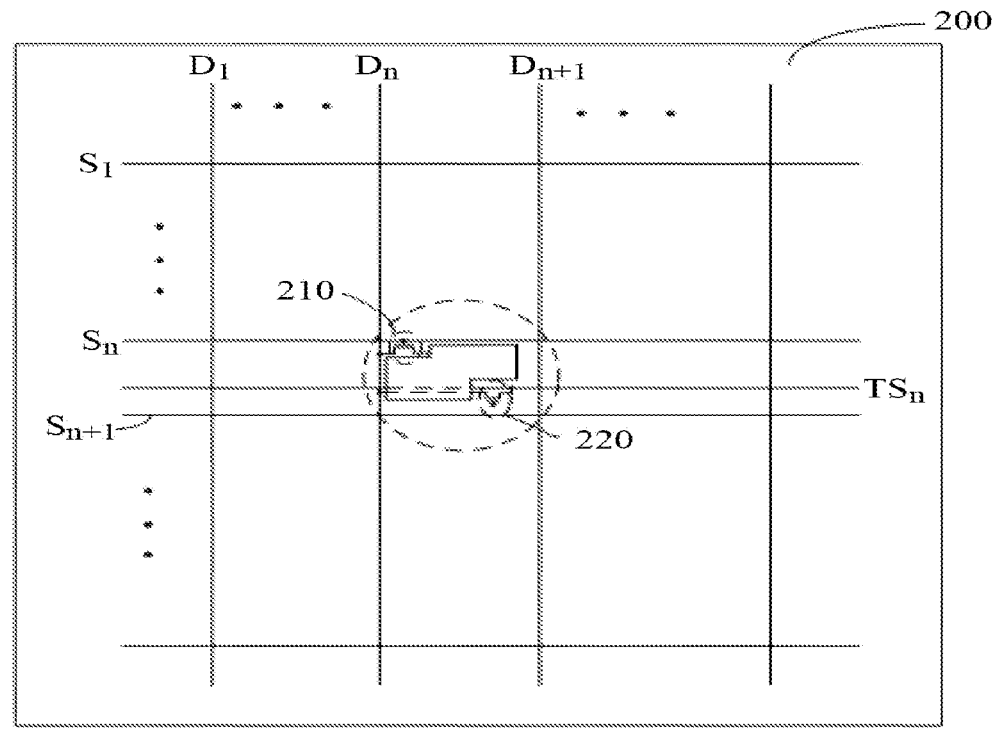
FIG. 15 is another schematic structural diagram in a top view of a TFT array substrate provided by an embodiment of the present invention.

As shown in FIG. 15, the structure of the touch TFT array provided by the fifth embodiment of the present invention is the same as that of the touch TFT array as shown in FIG. 5; the difference lies in that, the data lines of the pixel array in the fifth embodiment as shown in FIG. 15 share the touch drive lines of the touch TFT array, at this time, the touch drive signal of the touch TFT is an image data signal of the pixel array. Specifically, the touch TFT array in the TFT array substrate 200 includes:

a plurality of touch drive lines (i.e., data lines D); a plurality of touch induction lines TS; a plurality of touch TFTs, wherein the source electrode/drain electrode of each touch TFT is electrically connected with one of the touch drive lines, and the drain electrode/source electrode of each touch TFT is electrically connected with one of the touch induction lines;

in addition, the pixel array further includes:

a plurality of scanning lines intersected with the plurality of touch drive lines (i.e., data lines) in an insulated manner; a plurality of pixel units, each pixel unit being disposed in a pixel region enclosed by adjacent scanning lines and adjacent data lines. In general, each pixel unit includes a switch TFT and a pixel electrode; the gate electrode of the switch TFT is electrically connected with the scanning lines; the source electrode/drain electrode of the switch TFT is electrically connected with the data lines; the drain electrode/source electrode of the switch TFT is electrically connected with the pixel electrode.

In addition, as the same as the first embodiment, the second embodiment, the third embodiment and the fourth embodiment, the color filter substrate provided by the fifth embodiment is additionally provided with a plurality of conductive spacers disposed corresponding to the touch TFTs on the basis of the traditional color filter substrate, for controlling the current of the touch TFTs, so as to achieve a touch function. The color filter substrate provided by the fifth embodiment may adopt the structure as shown in FIG.

3 or may also adopt the structure as shown in FIG. 4; specific contents may refer to corresponding descriptions in the first embodiment, the second embodiment, the third embodiment and the fourth embodiment.

Similar to the first embodiment, the second embodiment and the third embodiment, if the touch display panel provided by the second embodiment adopts the color filter substrate as shown in FIG. 3, since a plurality of conductive spacers 110 are electrically connected together by an integral conductive layer 111, then in order to achieve the touch function, the touch drive lines (i.e., data lines) and the touch induction lines need to be intersected in an insulated manner (as shown in FIG. 15), and thus a touch coordinate may be determined.

Figure 16:
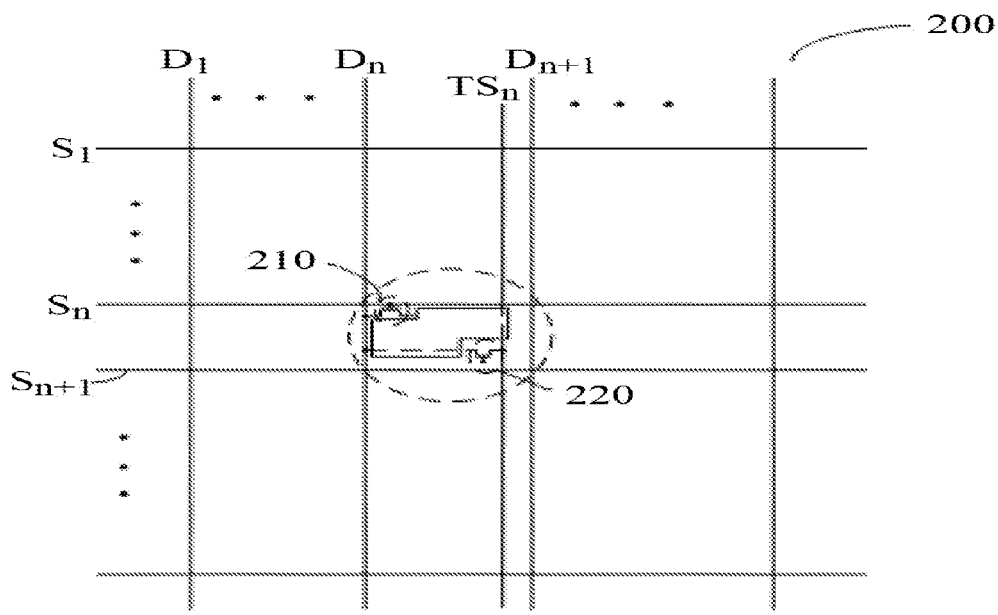
FIG. 16 is a third schematic structural diagram in a top view of a TFT array substrate provided by an embodiment of the present invention.

Similar to the fourth embodiment, if the touch display panel provided by the fifth embodiment adopts the color filter substrate as shown in FIG. 4, since the first conductive layer 111 includes a plurality of mutually separated first wires 1111, in order to achieve the touch function, as long as at least two of the touch drive lines (i.e., data lines), the touch induction lines and the first wires are intersected in an insulated manner, the touch coordinate may be determined by the two insulated intersected ones. Preferably, the touch coordinate may be determined by the first wires and the touch drive lines intersected in an insulated manner (i.e., data lines). At this time, the touch induction lines and the scanning lines may be located on the same layer, extend towards the same direction and be made from the same material (as shown in FIG. 15); the touch induction lines may also be located on the same layer as the data lines, extend towards the same direction and be made from the same material (as shown in FIG. 16).

It should be noted that, the switch TFT of the pixel unit in the touch display panel provided by the fifth embodiment of the present invention may adopt the bottom gate TFT as shown in FIG. 7 and FIG. 9, or may also adopt the top gate TFT as shown in FIG. 8. The corresponding arrangement between the conductive spacer and the touch TFT, may adopt either the manner as shown in FIG. 8 that the conductive spacer is disposed to be aligned to the top gate of the touch TFT or the manner as shown in FIG. 9 that the conductive spacer is disposed to be aligned to the touch electrode electrically connected with the touch TFT bottom gate. The color filter substrate may also adopt the structure as shown in FIG. 10 to FIG. 13. In the fifth embodiment, the main spacer as shown in FIG. 14 may also be adopted. Compared with the first embodiment, the second embodiment, the third embodiment and the fourth embodiment, except the condition that the data lines and the touch drive lines share the same line, the rest structures in the fifth embodiment of the present invention may adopt identical structures in the first embodiment, these identical structures may refer to corresponding descriptions in the first embodiment and in the accompanying drawings thereof, and will not be repeated redundantly herein.

In addition, the touch display panel provided by the fifth embodiment of the present invention further includes a scanning drive circuit electrically connected with the scanning lines; a data drive circuit electrically connected with the data lines (serving as a touch drive signal generating circuit as well) and a touch detecting circuit electrically connected with the touch induction lines.

Apparently, those skilled in the art may make various modifications and variations to the embodiments of the present invention, without departing from the essence and scope of the present invention. In this way, if these modifications and variations of the embodiments of the present invention fall into the scope of the claims of the present invention and the equivalent technology thereof, the present invention is intended to encompass these modifications and variations.

What is claimed is:

1. A touch display panel, comprising:
    a thin film transistor (TFT) array substrate, comprising:
        a plurality of scanning lines,
        a plurality of data lines insulated and intersected with the plurality of scanning lines, and
        a plurality of pixel units arranged in a pixel array,
        a plurality of touch drive lines,
        a plurality of touch induction lines, and
        a plurality of touch TFTs,
        wherein one of a source electrode and a drain electrode of each touch TFT is electrically connected with one of the touch drive lines, the other of the source electrode and the drain electrode of each touch TFT is electrically connected with one of the touch induction lines, the touch drive lines for touch and the data lines for display are shared, and a touch drive signal of the touch TFT is an image data signal of the pixel array;
    a color filter substrate, comprising a plurality of conductive spacers facing the TFT array substrate, wherein the conductive spacers are disposed so as to correspond with the touch TFTs for controlling the channel current of the touch TFTs; and
    a main spacer, wherein when no touch occurs, two ends of the main spacer respectively contact the TFT array substrate and the color filter substrate, and a length of the main spacer is equal to a length of the conductive spacer.

2. The touch display panel according to claim 1, wherein the touch TFT comprises:
    an active layer;
    a source electrode; and a drain electrode,
    wherein the source electrode and the drain electrode are electrically connected with the active layer, wherein the source electrode and the drain electrode are separated, and wherein the active layer between the source electrode and the drain electrode forms a channel.

3. The touch display panel according to claim 2, wherein:
    when no touch occurs, the free end of the conductive spacer does not contact the TFT array substrate, and the channel current is 0; and
    when a touch occurs, the conductive spacer approaches the channel of the touch TFT with pressing, and the channel current is not 0.

4. The touch display panel according to claim 2, wherein the free end of the conductive spacer is aligned with the channel of the touch TFT, and when a touch occurs, the conductive spacer is isolated from an active layer in the channel region by an insulating layer.

5. The touch display panel according to claim 1, wherein the touch TFT comprises:
    an active layer;
    a source electrode; and a drain electrode,
    wherein the source electrode and the drain electrode are electrically connected with the active layer, the source electrode and the drain electrode are separated, the active layer between the source electrode and the drain electrode forms a channel; and
    a top gate electrode located above the channel, wherein when a touch is applied to the touch display panel, the top gate electrode is disconnected from a scanning line of the touch display panel, and when no touch is applied to the touch display panel, the top gate electrode is disconnected from a scanning line of the touch display panel.

6. The touch display panel according to claim 5, wherein the free end of the conductive spacer is aligned with the top gate of the touch TFT, and when touch occurs, the conductive spacer is electrically connected with the top gate.

7. The touch display panel according to claim 1, wherein the touch TFT comprises:
an active layer;
a source electrode; and a drain electrode,
wherein the source electrode and the drain electrode are electrically connected with the active layer respectively, wherein the source electrode and the drain electrode are separate, and wherein the active layer between the source electrode and the drain electrode forms a channel; and
a bottom gate electrode located below the channel,
wherein the TFT array substrate further comprises a touch electrode located on the surface layer thereof and electrically connected with the bottom gate of the touch TFT, the bottom gate of the touch TFT is disconnected from a scanning line of the touch display panel when a touch is applied to the touch display panel, and the bottom gate of the touch TFT is disconnected from a scanning line of the touch display panel when no touch is applied to the touch display panel.

8. The touch display panel according to claim 7, wherein the free end of the conductive spacer is aligned with the touch electrode, and when touch occurs, the conductive spacer is electrically connected with the touch electrode.

9. The touch display panel according to claim 1, wherein the color filter substrate further comprises a first conductive layer electrically connected with the plurality of conductive spacers.

10. The touch display panel of claim 9, wherein the first conductive layer is of an integral structure.

11. The touch display panel according to claim 9, wherein the conductive spacer comprises:
an insulating column; and
a second conductive layer located on the surface of the insulating column, wherein the first conductive layer and the second conductive layer are connected, are located on the same layer, and are made from the same material.

12. The touch display panel according to claim 1, wherein the conductive spacer is made from a conductive organic material, and the first conductive layer is a conductive black matrix.

13. The touch display panel according to claim 12, wherein:
the color filter substrate further comprises an upper substrate and a color filter layer, and the black matrix is located between the upper substrate and the color filter layer; or the color filter substrate further comprises an upper substrate and a color filter layer thereon, and the black matrix is located between the color filter layer and the conductive spacer.

14. The touch display panel according to claim 1, wherein the main spacer comprises a first main spacer and a second main spacer, wherein the first main spacer transmits an external drive signal from the TFT array substrate to the first conductive layer on the color filter substrate.

15. The touch display panel according to claim 1, wherein:
one touch TFT is disposed in each pixel region; or
one touch TFT is disposed in the pixel region every preset number of pixel units.

16. A touch display panel, comprising:
a thin film transistor (TFT) array substrate, comprising:
a plurality of scanning lines,
a plurality of data lines insulated and intersected with the plurality of scanning lines, and
a plurality of pixel units,
a plurality of touch drive lines,
a plurality of touch induction lines, and
a plurality of touch TFTs,
wherein one of a source electrode and a drain electrode of each touch TFT is electrically connected with one of the touch drive lines, the other of the source electrode and the drain electrode of each touch TFT is electrically connected with one of the touch induction lines, and the touch drive lines for touch and the data lines for display are shared:
a color filter substrate, comprising a plurality of conductive spacers facing the TFT array substrate and a first conductive layer electrically connected with the plurality of conductive spacers, wherein the conductive spacers are disposed so as to correspond with the touch TFTs for controlling the channel current of the touch TFTs; and the first conductive layer comprises a plurality of separated first wires, and each first wire is at least electrically connected with one conductive spacer, and the first wires are different from the touch drive lines and the touch induction lines; and
a main spacer, wherein when no touch occurs, two ends of the main spacer respectively contact the TFT array substrate and the color filter substrate, and a length of the main spacer is equal to a length of the conductive spacer.

17. The touch display panel according to claim 16, wherein at least two of the touch drive lines, the touch induction lines, and the first wires are intersected in an insulated manner.

18. A touch display device, comprising a touch display panel, wherein the touch display panel comprises:
a thin film transistor (TFT) array substrate, comprising:
a plurality of scanning lines,
a plurality of data lines insulated and intersected with the plurality of scanning lines,
a plurality of pixel units arranged in a pixel array,
a plurality of touch drive lines,
a plurality of touch induction lines, and
a plurality of touch TFTs,
wherein one of a source electrode and a drain electrode of each touch TFT is electrically connected with one of the touch drive lines, the other of the source electrode and the drain electrode of each touch TFT is electrically connected with one of the touch induction lines, the touch drive lines for touch and the data lines for display are shared, and a touch drive signal of the touch TFT is an image data signal of the pixel array;
a color filter substrate, comprising a plurality of conductive spacers facing the TFT array substrate, wherein the conductive spacers are disposed so as to correspond with the touch TFTs for controlling the channel current of the touch TFTs; and
a main spacer, wherein when no touch occurs, two ends of the main spacer respectively contact the TFT array substrate and the color filter substrate, and a length of the main spacer is equal to a length of the conductive spacer.

* * * * *